United States Patent [19]
Annen et al.

[11] Patent Number: 5,758,835
[45] Date of Patent: Jun. 2, 1998

[54] MAGNETIC TAPE APPARATUS FOR CONTROLLING A BACK TENSION OF A MAGNETIC TAPE RUNNING ON A ROTARY DRUM

[75] Inventors: Ryoichi Annen; Keiichi Setsumasa; Naoki Ode, all of Atsugi, Japan; Hugo William Maule, Chepstow, Wales; Peter J. Steven, Bristol, England

[73] Assignees: Mitsumi Electric Co., Ltd., Tokyo, Japan; Hewlett-Packard Company, Palo Alto, Calif.

[21] Appl. No.: 771,427

[22] Filed: Dec. 20, 1996

[30] Foreign Application Priority Data

Dec. 26, 1995 [JP] Japan .................... 7-339731

[51] Int. Cl.$^6$ ............................................. B65H 59/38
[52] U.S. Cl. ............................................. 242/334
[58] Field of Search .......................... 242/334, 334.5, 242/355, 357; 360/93, 94, 96.5, 96.6

[56] References Cited

U.S. PATENT DOCUMENTS

| | | | |
|---|---|---|---|
| 3,091,410 | 5/1963 | Widener | 242/334.5 X |
| 3,170,651 | 2/1965 | Galke et al. | 242/334 X |
| 3,606,976 | 9/1971 | Lewis | 242/335 X |
| 4,018,402 | 4/1977 | Burdorf | 242/334.5 |
| 4,664,337 | 5/1987 | Shiratori | 242/199 |
| 4,788,558 | 11/1988 | Caldwell et al. | 242/334.5 X |
| 4,964,001 | 10/1990 | Hirayama et al. | |
| 5,209,422 | 5/1993 | Lee | 242/334.5 |
| 5,625,509 | 4/1997 | Matsuoka | 242/334 X |
| 5,677,810 | 10/1997 | Lee . | |

*Primary Examiner*—Donald P. Walsh
*Assistant Examiner*—William A. Rivera
*Attorney, Agent, or Firm*—Ladas & Parry

[57] ABSTRACT

A magnetic tape apparatus includes a head which reproduces data from or records data onto a magnetic tape, taken out from a cassette, when the tape is running. A supply reel shaft rotates a supply reel to supply the tape from the cassette to the head. A take-up reel shaft rotates a take-up reel to wind the tape from the head around the take-up reel. A back tension applying mechanism has a brake part which presses the supply reel shaft to produce a braking force on the supply reel shaft, the back tension applying mechanism applying a back tension to the tape when the braking force is produced. A pressing force varying mechanism controls a pressing force of the brake part on the supply reel shaft such that the pressing force is maintained at an appropriate level for a type of cassette.

8 Claims, 8 Drawing Sheets

| TAPE CASSETTE TYPE | | | POSITION OF CAM 40 | POSITION OF PART 87 | FORCE OF SPRING 54 (gr) | PRESSING FORCE OF PART 53 (gr) | BRAKING TORQUE BF (g-cm) | BACK TENSION T (gr) |
|---|---|---|---|---|---|---|---|---|
| (A) 60-120 | (B) 60-90 | (C) 60-60 | | | | | | |
| ↶ 110 | | | $P_1(P_{1a})$ | $Q_1$ | 50 | 50 | 4 | 5 |
| | ↶ 120 | | $P_2(P_{2a})$ | $Q_2$ | 60 | 60 | 5 | 6 |
| | | ↶ 131 ↶ 130 | $P_3(P_{3a})$ | $Q_3$ | 70 | 70 | 6 | 7 |
| | | | $P_4(P_{4a})$ | $Q_4$ | 80 | 80 | 7 | 8 |
| | | | $P_5(P_{5a})$ | $Q_5$ | 90 | 90 | 8 | 9 |
| | | | $P_6(P_{6a})$ | $Q_6$ | 100 | 100 | 9 | 10 | ps
MAGNETIC TAPE APPARATUS FOR CONTROLLING A BACK TENSION OF A MAGNETIC TAPE RUNNING ON A ROTARY DRUM

BACKGROUND OF THE INVENTION

(1) Field of the Invention

The present invention generally relates to a magnetic tape apparatus for reproducing data from or recording data onto a magnetic tape, and more particularly to an improvement of a magnetic tape apparatus which uses a back tension applying mechanism to apply a back tension to a magnetic tape when the magnetic tape is running on a rotary drum.

(2) Description of the Related Art

A digital audio tape recorder (DAT) system is known as a magnetic tape apparatus. The DAT system includes a tape loading mechanism which takes out a magnetic tape from a tape cassette and puts the magnetic tape on a rotary drum. The tape cassette contains the magnetic tape, a supply reel and a take-up reel, and the magnetic tape is wound on the supply reel and the take-up reel in the cassette.

In the DAT system, the magnetic tape taken out from the cassette runs on a rotary drum in a given tape path from the supply reel and the take-up reel. The rotary drum includes a head which reads data from or writes data onto the magnetic tape. By using the head, recording or reproducing of data with the magnetic tape is carried out by the DAT system when the magnetic tape is running on the rotary drum.

It is important for the DAT system to provide a stable, good recording and reproducing performance for the whole length of the magnetic tape at any time when the tape cassette is running on the rotary drum. In order to attain this, it is desirable that a back tension applied to the magnetic tape is kept at an optimal level for any portion of the magnetic tape and at any time when it is running on the rotary drum, in order to maintain the contact between the head and the magnetic tape in an appropriate manner.

There are some types of tape cassettes which can be inserted into the DAT system for the use, and each type contains a magnetic tape with a different length. For example, a 60-m tape cassette containing a magnetic tape which is 60 meters long, a 90-m tape cassette containing a magnetic tape which is 90 meters long, and a 120-m tape cassette containing a magnetic tape which is 120 meters long. Since the magnetic tapes of these cassettes have different thicknesses, an optimal value of the back tension which should be applied to the magnetic tape from each tape cassette in order to make the contact between the head and the magnetic tape suitable is different one from another. Generally speaking, the smaller the magnetic tape thickness is, the smaller the optimal value of the back tension is.

A conventional DAT system includes a back tension applying mechanism. However, the back tension applying mechanism applies a fixed level of the back tension to the magnetic tape, and it is difficult for the conventional DAT system to vary the back tension applied to the magnetic tape to one of different optimal values according to the type of the tape cassette.

The back tension applying mechanism in the conventional DAT system is a mechanical type. It is conceivable that an electrical type of the back tension applying mechanism utilizing a driving motor be used for the DAT system. However, the electrical type is relatively expensive and bulky. The mechanical type is advantageous over the electrical type from the point of view of the cost for the DAT system.

Therefore, it is desirable to provide a DAT system including a mechanical back tension applying mechanism in which the back tension applied to the magnetic tape can be varied to a desired one of different optimal values according to the type of the tape cassette.

Figure 1:
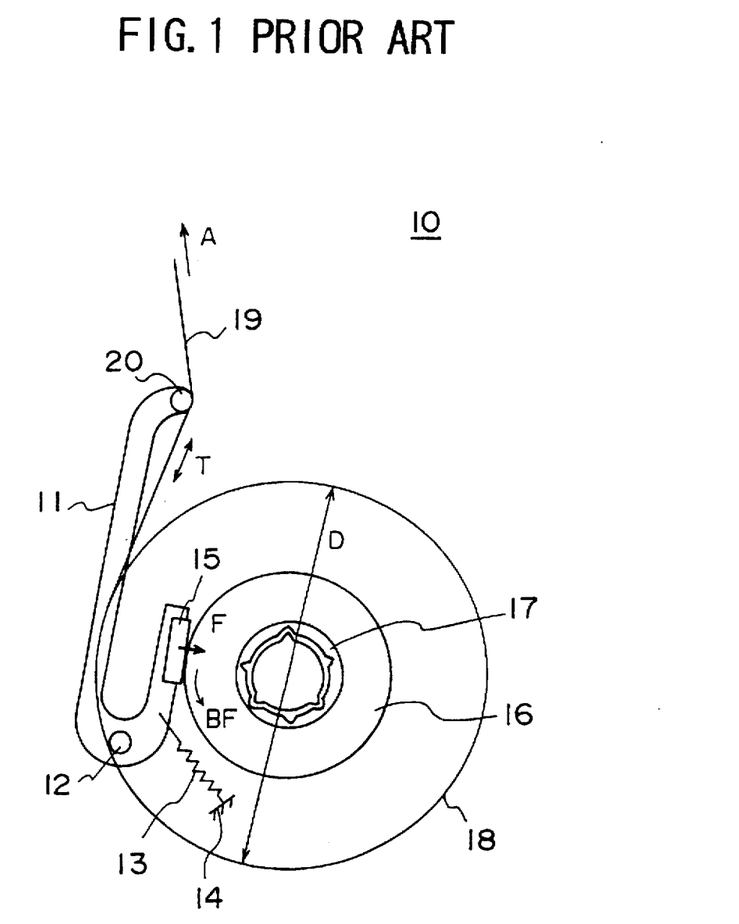
FIG. 1 is a diagram showing an example of a conventional back tension applying mechanism.

FIG. 1 shows an example of the conventional back tension applying mechanism in the DAT system. As shown in FIG. 1, the back tension applying mechanism 10 is a mechanical type which does not utilize a driving motor, and it has a U-shaped tension arm 11 which is rotatably supported on a shaft 12 of a chassis (not shown) of the DAT system. A spring 13 is fixed at one end to a spring fixing part 14 on the chassis, and it is connected at the other end to the tension arm 11. The spring 13 exerts a rotating force on the tension arm 11 so as to rotate the tension arm 11 clockwise around the shaft 12.

A brake part 15 is provided at one end of the tension arm 11, and a pressing force "F" of the brake part 15 acts on the periphery of a supply reel shaft 16 so that a braking force "BF" is exerted on the supply reel shaft 16 as shown in FIG. 1.

A supply reel 17 of a tape cassette (not shown) on which a magnetic tape 19 is wound is fitted onto the supply reel shaft 16. The outermost region of the magnetic tape 19 wound on the supply reel 17 forms a tape winding periphery 18. A diameter of the tape winding periphery 18 is indicated by "D" in FIG. 1. The magnetic tape 19 which is taken out from the supply reel 17 at the tape winding periphery 18 is guided on a tension detecting part 20. The tension detecting part 20 is provided at the other end of the tension arm 11.

In the back tension applying unit 10, a back tension "T" which corresponds to the braking force BF on the supply reel shaft 16 is applied to the magnetic tape 19 when the magnetic tape 19 is running in a direction indicated by the arrow "A" in FIG. 1.

The spring fixing part 14 is fixed to the chassis of the DAT system. One end of the spring 13 which is fixed to the spring fixing part 14 is always at a fixed position on the chassis. The pressing force F of the brake part 15 on the supply reel shaft 16 can be regulated in a range of the back tension T that can be detected by the tension detecting part 20. A range of the pressing force F that can be regulated according to the back tension T detected by the tension detecting part 20 is limited. Therefore, the braking force BF can be regulated in a very narrow range, and the back tension T applied to the magnetic tape 19, when the magnetic tape is running, is fixed to be at a substantially constant level which is determined by a strength of the spring 13.

Figure 2:
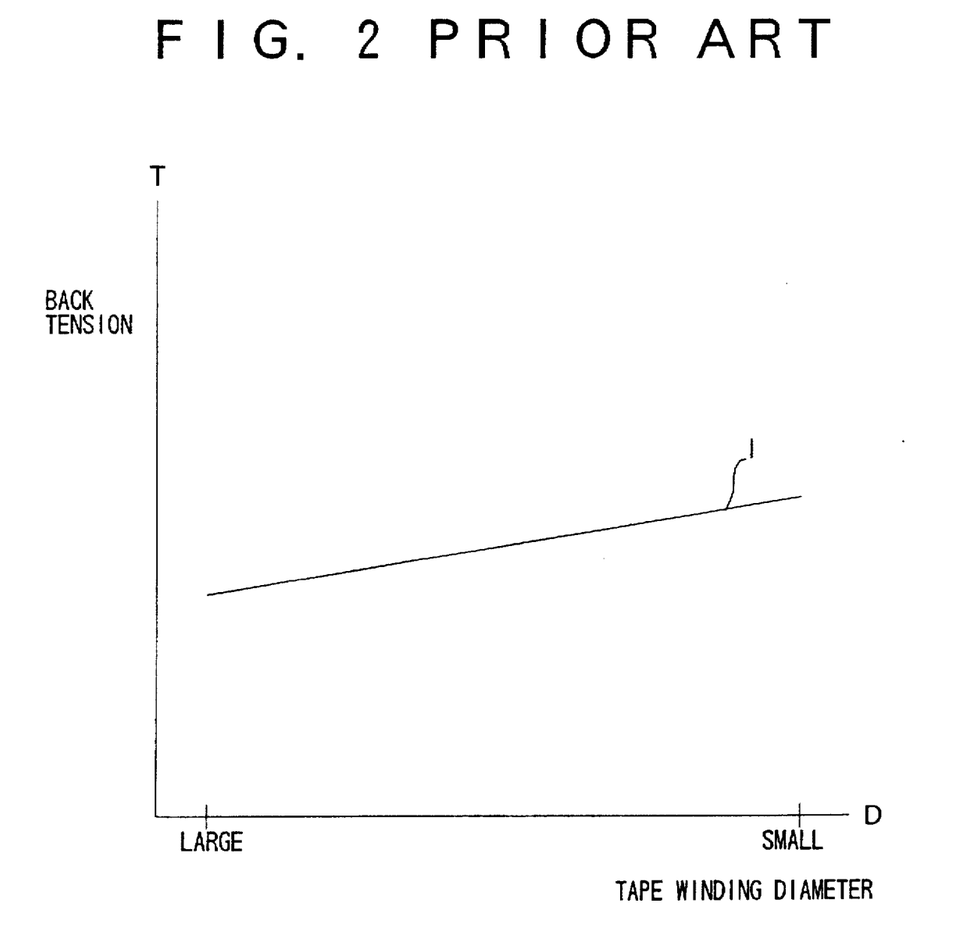
FIG. 2 is a diagram for explaining a relationship between a tape winding diameter and a back tension of the back tension applying mechanism in FIG. 1.

FIG. 2 shows a relationship between the tape winding diameter "D" and the back tension "T" of the back tension applying mechanism 10 in FIG. 1.

As indicated by a straight line "T" in FIG. 2, when the magnetic tape 19 is running in the direction A and the recording or reproducing of data with the magnetic tape 19 is performed, the back tension T applied to the magnetic tape 19 is gradually increased as the diameter of the tape winding periphery 18 on the supply reel 17 becomes small.

If the strength of the spring 13 is preset such that the back tension T is at an optimal value when the recording or reproducing of data is performed with the beginning of the magnetic tape 19 (the diameter D is large), the back tension T will be too great when the end of the magnetic tape 19 is subjected to the recording or reproducing (the diameter D becomes small). Therefore, it is difficult for the back tension applying mechanism 10 to provide a stable, good recording and reproducing performance for the whole length of the magnetic tape 19 at any time when the magnetic tape 19 is running on the rotary drum.

In addition, since the back tension T applied to the magnetic tape 19 in the back tension applying mechanism 10 cannot be suitably varied, it is likely that the fixed level of the back tension T may be too great or too small for a particular type of the tape cassette loaded into the DAT system.

SUMMARY OF THE INVENTION

Accordingly, an object of the present invention is to provide an improved magnetic tape apparatus in which the above-described problems are eliminated.

Another object of the present invention is to provide a magnetic tape apparatus which provides a stable, good recording and reproducing performance for the whole length of the magnetic tape at any time when the tape cassette is running on the rotary drum.

A further object of the present invention is to provide a magnetic tape apparatus which maintains a back tension applied to the magnetic tape at an optimal level for any portion of the magnetic tape and at any time when it is running on the rotary drum.

The above-mentioned objects of the present invention are achieved by a magnetic tape apparatus in which a cassette having a magnetic tape, a supply reel and a take-up reel is inserted, the tape being wound on the supply reel and the take-up reel in the cassette, the cassette having a type according to an overall length of the tape, the magnetic tape apparatus comprising: a head which reproduces data from or records data onto the tape, taken out from the cassette, when the tape is running; a supply reel shaft which rotates the supply reel to supply the tape from the cassette to the head; a take-up reel shaft which rotates the take-up reel to wind the tape from the head around the take-up reel; a back tension applying mechanism having a brake part which presses the supply reel shaft to produce a braking force on the supply reel shaft, the back tension applying mechanism applying a back tension to the tape when the braking force is produced; and a pressing force varying mechanism which controls a pressing force of the brake part on the supply reel shaft such that the pressing force is maintained at an appropriate level for the type of the cassette.

The magnetic tape apparatus of the present invention includes the pressing force varying unit which suitably varies the pressing force of the brake part on the supply reel shaft to a desired level for the magnetic tape taken out from the tape cassette. Even when the diameter of the tape winding on the supply reel decreases, the pressing force varying unit suitably varies the pressing force so that the desired level of the pressing force is maintained. It is possible for the magnetic tape apparatus of the present invention to provide a stable, good recording and reproducing performance for the whole length of the magnetic tape at any time when the tape cassette is running on the rotary drum. It is possible for the magnetic tape apparatus to maintain the back tension applied to the magnetic tape at an optimal level for any portion of the magnetic tape and at any time when it is running on the rotary drum. Further, it is possible to provide a stable, good recording and reproducing performance for each of a plurality of tape cassette types having magnetic tapes with different thicknesses.

BRIEF DESCRIPTION OF THE DRAWINGS

The above and other objects, features and advantages of the present invention will become more apparent from the following detailed description when read in conjunction with the accompanying drawings in which.

DETAILED DESCRIPTION OF THE PREFERRED EMBODIMENT

A description will now be given of the preferred embodiment of the present invention with reference to the accompanying drawings.

Figure 3:
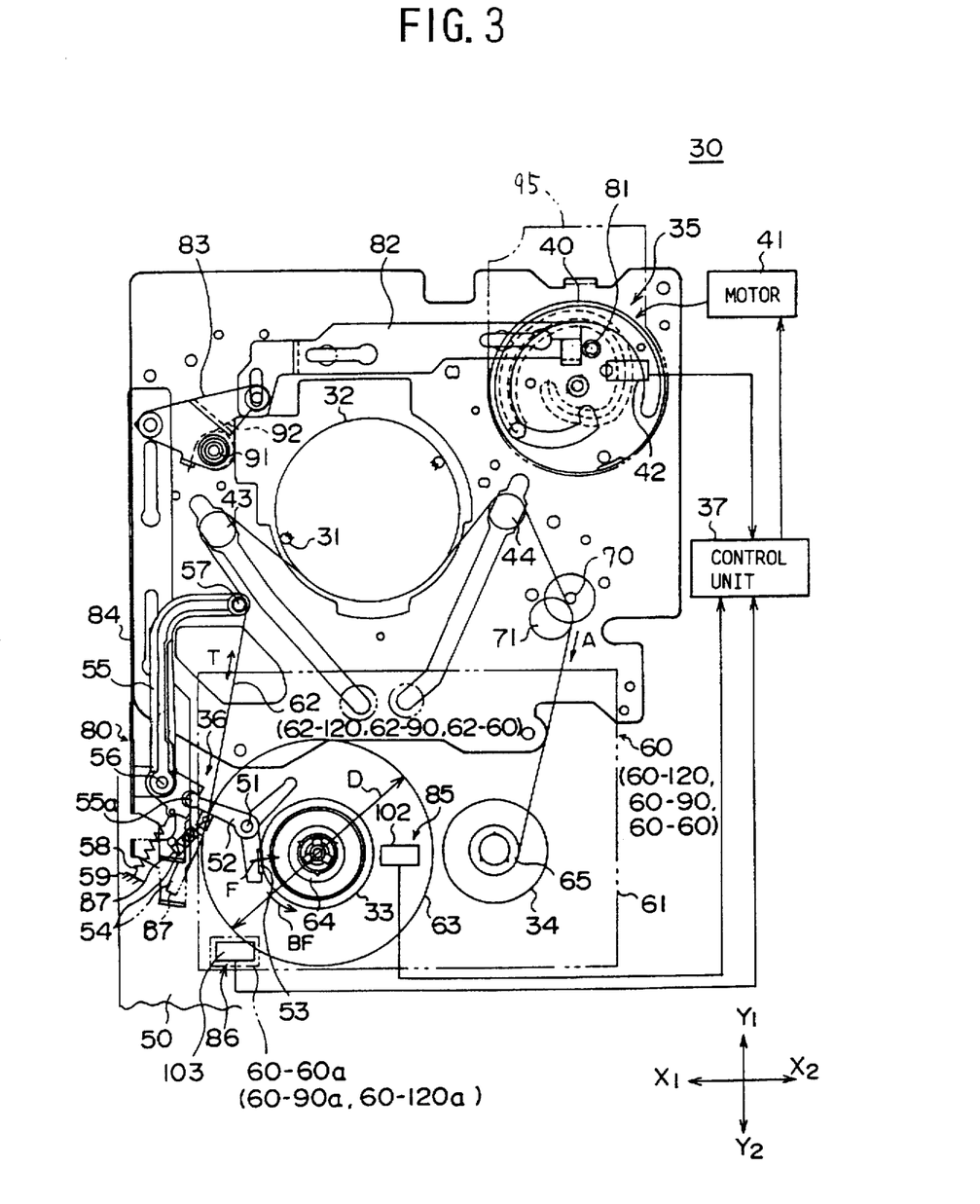
FIG. 3 is a diagram showing a DAT system to which a magnetic tape apparatus in one embodiment of the present invention is applied.

FIG. 3 shows a DAT system to which a magnetic tape apparatus 30 in one embodiment of the present invention is applied. In FIG. 3, a lateral direction of the magnetic tape apparatus 30 is indicated by the arrow "X1-X2", and a longitudinal direction of the magnetic tape apparatus 30 is indicated by the arrow "Y1-Y2".

Referring to FIG. 3, the magnetic tape apparatus 30 generally has a rotary drum 32, a supply reel shaft 33, a take-up reel shaft 34, a tape loading mechanism 35, a back tension applying mechanism 36, and a control unit 37. The rotary drum 32 includes a read/write head 31 which reads data from and/or writes data onto a magnetic tape when the tape is running on the rotary drum 32. The control unit 37 is comprised of a microcomputer, which will be described later.

A tape cassette 60, which is indicated by a two-dot chain line in FIG. 3, is inserted into the magnetic tape apparatus 30.

The tape loading mechanism 35 includes a cam 40, a cam rotating motor 41, a cam position detecting unit 42, and a pair of poles 43 and 44. The motor 41 rotates the cam 40 around a rotating shaft of the cam 40. The cam position detecting unit 42 detects a rotational position of the cam 40 around the rotating shaft relative to a reference position.

The tape loading mechanism 35 further includes a pole moving mechanism (not shown) and a cassette holder moving mechanism (not shown). The pole moving mechanism is driven by the rotation of the cam 40 to move the poles 43 and 44. The cassette holder moving mechanism is driven by the rotation of the cam 40 to move a cassette holder (not shown).

Figure 4:
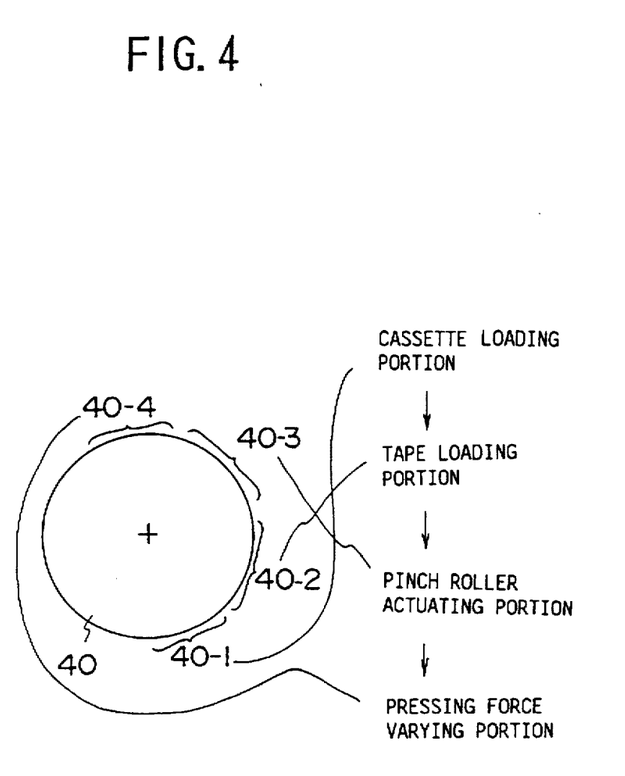
FIG. 4 is a diagram for explaining a configuration of a cam of the magnetic tape apparatus in FIG. 3.

FIG. 4 shows a configuration of the cam 40 used by the magnetic tape apparatus 30. As shown in FIG. 4, the cam 40 includes a cassette loading portion 40-1, a tape loading portion 40-2, a pinch roller actuating portion 40-3, and a pressing force varying portion 40-4 which are arranged in this order in a counter-clockwise direction around the rotating shaft. The cam 40 is rotated around the rotating shaft to one of these portions 40-1, 40-2, 40-3 and 40-4, and the magnetic tape apparatus 30 carries out a corresponding operation of the cassette loading, the tape loading, the pinch roller actuating, and the pressing force varying.

The pressing force varying operation mentioned above constitutes an important part of the present invention, which will be described later. The other operations mentioned above, performed by the magnetic tape apparatus 30, are the same as those corresponding operations by the prior art magnetic tape apparatus, and a description thereof will be omitted.

As described above, the magnetic tape apparatus 30 of the present embodiment includes the back tension applying mechanism 36. The back tension applying mechanism 36 includes a brake arm 52, a brake part 53, a helical tension spring 54, a tension arm 55 and a helical tension spring 58. The brake arm 52 is rotatably supported on a shaft 51 of a chassis 50 of the DAT system. The brake part 53 is fixed to the brake arm 52. The helical tension spring 54 exerts a rotating force on the brake arm 52 such that the brake arm 52 is rotated counter-clockwise around the shaft 51 by the spring 54. As the rotating force of the spring 54 is exerted on the brake arm 52, the brake part 53 on the brake arm 52 presses the periphery of the supply reel shaft 33 by a pressing force "F" as indicated in FIG. 3.

The tension arm 55 is rotatably supported on a shaft 56 of the chassis 50. The helical tension spring 58 exerts a rotating force on the tension arm 55 such that the tension arm 55 is rotated clockwise around the shaft 56 by the spring 58. A tension detecting part 57 is provided at one end of the tension arm 55. The tension arm 55 has a recessed portion 55a at a base of the tension arm 55, and the recessed portion 55a is connected to the brake arm 52. One end of the helical tension spring 58 is connected to a hook portion 59 of the chassis 50.

The tape cassette 60 includes a case 61, a magnetic tape 62, a supply reel 64 and a take-up reel 65. In the case 61, the magnetic tape 62 is wounded on the supply reel 64 and/or the take-up reel 65, and these elements are enclosed by the case 61. The outermost region of the tape winding on the supply reel 64 forms a tape winding periphery 63. A diameter of the tape winding periphery 63 is indicated by "D" as shown in FIG. 3.

When the cassette 60 is inserted into the cassette holder (not shown), the tape loading mechanism 35 starts moving. The tape loading mechanism 35 first moves the cassette holder so that the supply reel 64 is fitted onto the supply reel shaft 33 and the take-up reel 65 is fitted onto the take-up reel shaft 34. After the cassette 60 is loaded, tape loading is performed. The poles 43 and 44 are moved, and the magnetic tape 62 is taken out from the case 61. The magnetic tape 62 is put on the rotary drum 32 in a range of a given angle (for example, 90 degrees) around the center of the rotary drum 32, and the magnetic tape 62 is set in a tape running path within the magnetic tape apparatus 30.

As shown in FIG. 3, a capstan 70 and a pinch roller 71 are provided at an intermediate position in the tape running path. When the magnetic tape 62 is set in the tape running path, the pinch roller 71 presses the magnetic tape 62 on the capstan 70. The capstan 70 on which the magnetic tape 62 is pinched by the pinch roller 71 is rotated by a capstan motor (not shown), and the magnetic tape 62 runs along the tape running path in a direction, indicated by the arrow "A" in FIG. 3, by the rotation of the capstan 70. Therefore, when the capstan 70 is rotated, the magnetic tape 62, taken out from the supply reel 64, runs on the rotary drum 32, and the magnetic tape 62 from the rotary drum 32 is wound around the take-up reel 65.

When the magnetic tape 62 is running on the rotary drum 32, the magnetic tape apparatus 30 performs a recording or reproducing of data with the magnetic tape 62 by using the head 31.

The brake part 53 presses the periphery of the supply reel shaft 33, and a braking force "BF" by the brake part 53 acts on the supply reel shaft 33. When the braking force BF on the supply reel shaft 33 is produced, a back tension "T" by the tension arm 55 is applied to the magnetic tape 62 taken out from the cassette 60.

When the tension detecting part 57 is moved due to an increase of the back tension T applied to the magnetic tape 62, the back tension applying mechanism 36 reduces the back tension T. That is, the tension arm 55 in this case is rotated counter-clockwise around the shaft 56 by the magnetic tape 62, and the brake arm 52 is rotated clockwise around the shaft 51 so that the pressing force "F" of the brake part 53 acting on the supply reel shaft 33 is reduced. Thus, the back tension T is reduced.

When the tension detecting part 57 is moved due to a decrease of the back tension T applied to the magnetic tape 62, the back tension applying mechanism 36 increases the back tension T. That is, the tension arm 55 in this case is rotated clockwise around the shaft 56 by the magnetic tape 62, and the brake arm 52 is rotated counter-clockwise around the shaft 51 so that the pressing force "F" of the brake part 53 acting on the supply reel shaft 33 is increased. Thus, the back tension T is increased.

Figure 5:
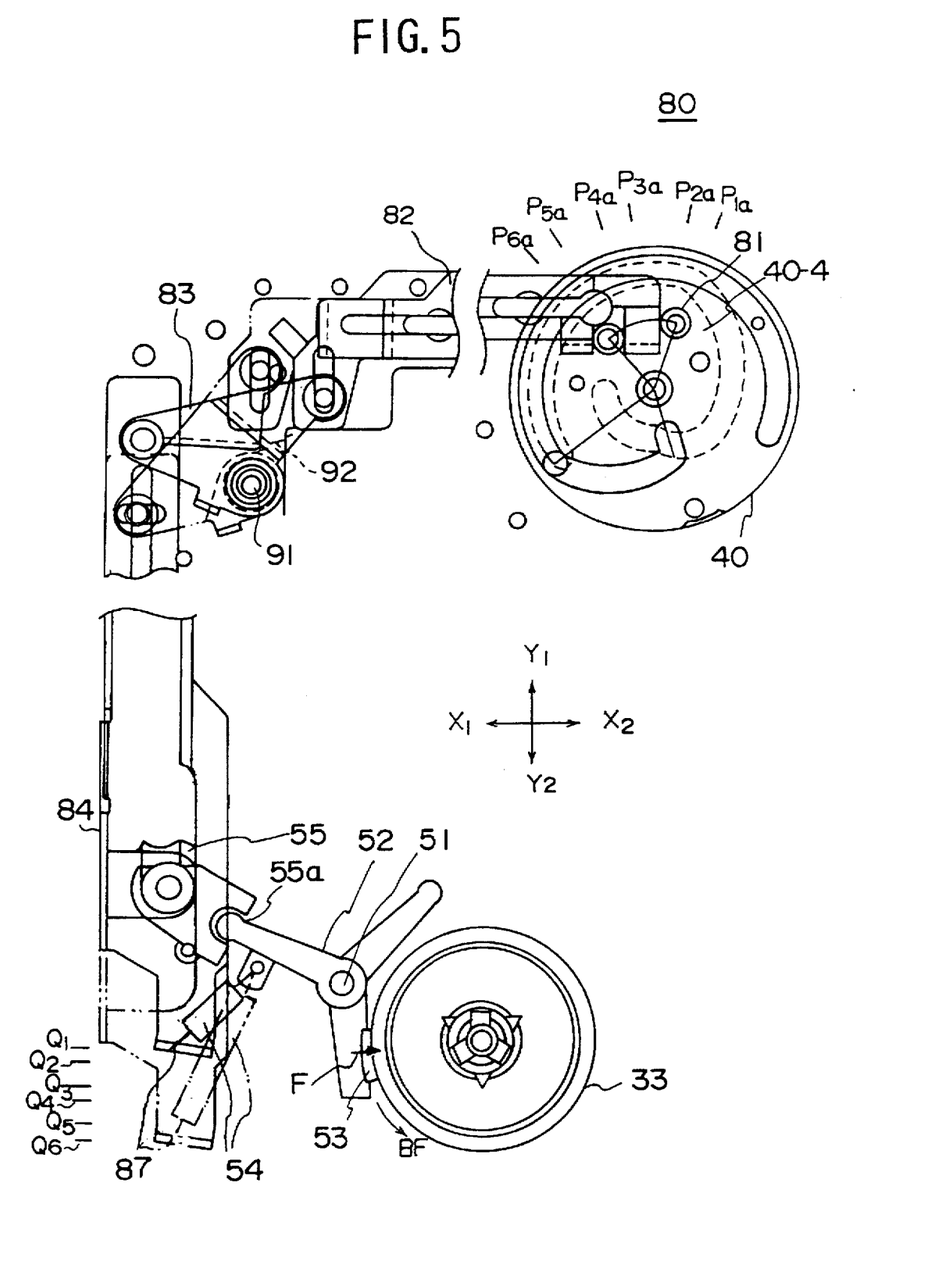
FIG. 5 is a diagram showing a pressing force varying mechanism of the magnetic tape apparatus in FIG. 3.

Next, FIG. 5 shows a pressing force varying mechanism 80 of the magnetic tape apparatus 30 in FIG. 3. Similarly to FIG. 3, in FIG. 5, the lateral direction of the magnetic tape apparatus 30 is indicated by the arrow "X1-X2", and a longitudinal direction of the magnetic tape apparatus 30 is indicated by the arrow "Y1-Y2".

The magnetic tape apparatus 30 of the present embodiment includes the pressing force varying mechanism 80. An important part of the present invention is constituted by the pressing force varying mechanism 80 or the operation performed by the pressing force varying mechanism 80.

Referring to FIG. 5, the pressing force varying mechanism 80 includes a pin 81, a sliding lever 82, a connecting lever 83, a sliding lever 84, the cam position detecting unit 42, a tape winding diameter detecting unit 85, a cassette type detecting unit 86, the cam rotating motor 41, and the control unit 37. Alternatively, the pressing force varying mechanism 80 may comprise a brake part, for example, in the form of a brake band wound around the supply reel shaft 33.

In the magnetic tape apparatus 30 of the present embodiment, the control unit 37 constitutes a part of the cam position detecting unit 42. The control unit 37 constitutes a part of the tape winding diameter detecting unit 85. The control unit 37 constitutes a part of the cassette type detecting unit 86. These will be described in detail later.

The pin 81 is fixed to the cam 40 at a given position in the pressing force varying portion 40-4 of the cam 40. The sliding lever 84 has a spring fixing part 87 at an end portion of the sliding lever 84. One end of the helical tension spring 54 is fixed to the spring fixing part 87.

The sliding lever 82, the connecting lever 83 and the sliding lever 84 are attached to a sub-chassis (not shown) of the DAT system. The sub-chassis is fixed to the chassis 50. As shown in FIG. 5, the sliding lever 82 is connected at one end to the pin 81 of the cam 40, and connected at the other end to the connecting lever 83. The connecting lever 83 is connected at one end to the sliding lever 82, and connected at the other end to the sliding lever 84. Further, the sliding lever 84 is connected at one end to the connecting lever 83, and the other end of the sliding lever 84 is connected to the helical tension spring 54 at the spring fixing part 87.

The sliding lever 82 is movable on the chassis 50 in the lateral direction "X1-X2", and the sliding lever 84 is movable on the chassis 54 in the longitudinal direction "Y1-Y2". The connecting lever 83 is rotatably supported on a pin 91 of the sub-chassis. A helical torsion spring 92, which is fixed to the sub-chassis, exerts a rotating force on the connecting lever 83 such that the connecting lever 83 is rotated clockwise around the pin 90 by the spring 92.

As shown in FIG. 3, the cam position detecting unit 42 is fixed to the sub-chassis. The cam position detecting unit 42 includes a pattern board 95, a brush 96 and the control unit 37.

Figure 6:
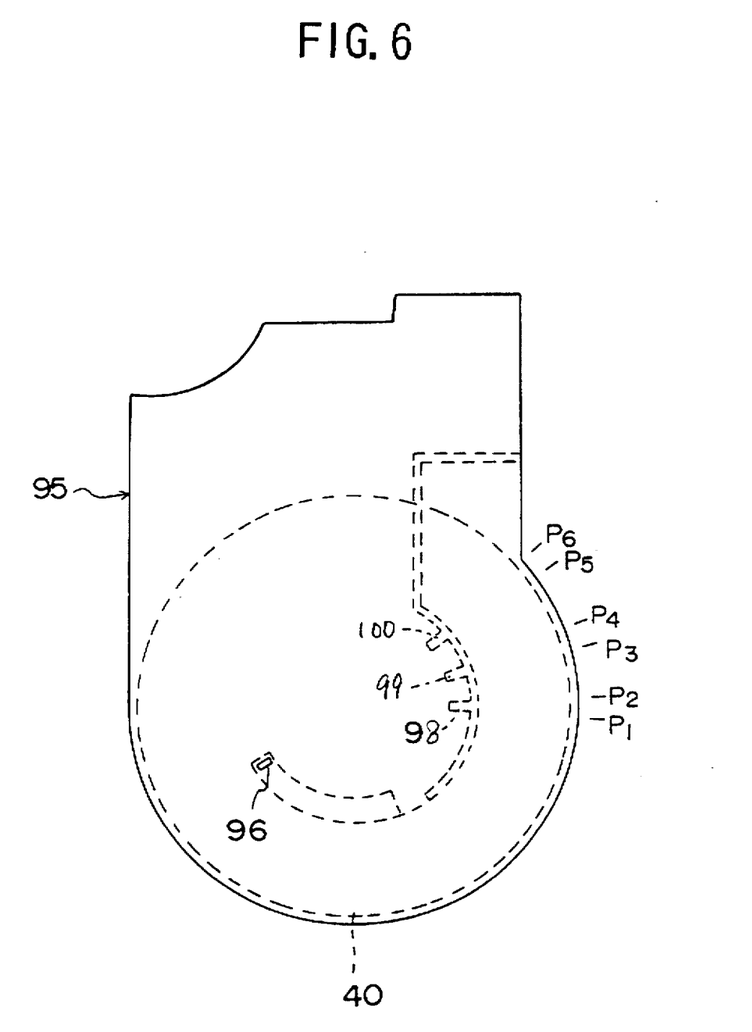
FIG. 6 is a diagram showing a pattern board and the cam in the pressing force varying mechanism.

FIG. 6 shows the pattern board 95 in the cam position detecting unit 42. The pattern board 95 is provided above the cam 40. The brush 96 is provided on the cam 40 at an intermediate portion of the cam 40. The pattern board 95 has a toothed pattern, as shown in FIG. 6, which includes a plurality of teeth 98, 99 and 100. The cam 40 has a plurality of rotational positions P1 through P6 on the periphery, and the positions P1–P2, the positions P3–P4 and the positions P5–P6 of the cam 40 correspond to the tooth 98, the tooth 99 and the tooth 100 of the pattern board 95, respectively.

When the cam 40 is rotated counter-clockwise by the motor 41, the brush 96 on the cam 40 is brought into contact with one of the teeth 98, 99 and 100 of the pattern board 95 in this order. When the brush 96 is contacted by each of the teeth 98, 99 and 100, a signal is sent from the brush 96 to the control unit 37. The control unit 37 detects a rotational position of the cam 40 around the rotating shaft based upon the signal from the brush 96, that is, the control unit 37, in response to the signal from the brush 96, makes a determination as to which of the rotational positions P1–P6 is the reference position of the cam 40 currently located at.

Referring to FIG. 5, when the reference position of the cam 40 is located at one of the rotational positions P1–P6, the pin 81 on the cam 40 pushes the end of the sliding lever 82 in the direction indicated by "X1" in FIG. 5. For the sake of convenience, positions P1a through P6a in the pressing force varying unit 80 in FIG. 5 which correspond to the rotational positions P1 through P6 of the cam 40 in FIG. 6 are indicated.

The connecting lever 83 at this time is rotated counter-clockwise around the pin 91 by the sliding lever 82, and the sliding lever 84 is moved in the direction, indicated by "Y2" in FIG. 5, by the connecting lever 83. At the same time, the spring fixing part 87 on the sliding lever 84 at the other end of the sliding lever 84 is moved by the connecting lever 83 in the same direction "Y2" to one of a plurality of positions Q1 through Q6 on the chassis 50. Thus, the rotating force of the helical tension spring 54, which is applied to rotate the brake arm 52 counter-clockwise around the shaft 51, is increased by the movement of the spring fixing part 87. The pressing force F of the brake part 53 on the supply reel shaft 33 can be increased (or varied) as the rotating force of the helical tension spring 54 is increased.

The positions Q1 through Q6 of the spring fixing part 87 correspond to the rotational positions P1 through P6 of the cam 40, respectively.

Referring to FIG. 3, the tape winding diameter detecting unit 85 is provided in the vicinity of the supply reel shaft 33.

The tape winding diameter detecting unit 85 includes a rotating speed sensor 102 and the control unit 37. The sensor 102 outputs a signal indicative of a rotating speed of the supply reel shaft 33 to the control unit 37. The control unit 37 detects the rotational speed of the supply reel shaft 33 based upon the signal output from the sensor 102. Further, the control unit 37 detects the tape winding diameter D of the supply reel 64 based upon the detected rotating speed and a time needed for the rotation of the supply reel shaft 33 to reach the detected rotating speed.

The cassette type detecting unit 86 is provided in the vicinity of the corner of the tape cassette 60. The cassette type detecting unit 86 includes a cassette type detecting switch 103 and the control unit 37.

There are some types of tape cassettes which can be inserted into the DAT system in FIG. 3 for the use. For example, a 60-m tape cassette containing a magnetic tape which is 60 meters long, a 90-m tape cassette containing a magnetic tape which is 90 meters long, and a 120-m tape cassette containing a magnetic tape which is 120 meters long. Each type contains a magnetic tape with a different length. Further, each type has a cassette type identification part at the corner of the case 61 of the tape cassette 60.

For the sake of identification of the cassette type and the magnetic tape contained therein, in FIG. 3, the 60-m tape cassette is indicated by "60-60", the magnetic tape contained in the 60-m tape cassette is indicated by "62-60", the 90-m tape cassette is indicated by "60-90", the magnetic tape contained in the 90-m tape cassette is indicated by "62-90", the 120-m tape cassette is indicated by "60-120", and the magnetic tape contained in the 120-m tape cassette is indicated by "62-120". Further, the cassette type identification parts of these cassettes are indicated by "60-60a", "60-90a" and "60-120a".

The cassette type detecting switch 103 outputs a signal indicating which of the cassette types the cassette type identification part of the case 61 of the inserted cassette 60 shows, to the control unit 37. The control unit 37 detects the cassette type of the inserted tape cassette 60 based upon the signal from the cassette type detecting switch 103.

The control unit 37 controls a forward rotation of the cam rotating motor 41 as a result of the detection of the cassette type by the cassette type detecting unit 86. When the inserted tape cassette 60 is detected to be the 120-m tape cassette based upon the signal from the switch 103, the control unit 37 outputs a control signal to the motor 41 so that the cam 40 is rotated by the motor 41 to the rotational position P2. Similarly, when the inserted tape cassette 60 is detected to be the 90-m tape cassette, the control unit 37 outputs a control signal to the motor 41 so that the cam 40 is rotated by the motor 41 to the rotational position P4. When the inserted tape cassette 60 is detected to be the 60-m tape cassette, the control unit 37 outputs a control signal to the motor 41 so that the cam 40 is rotated by the motor 41 to the rotational position P6.

Further, when the magnetic tape 62 is running in the forward direction on the rotary drum 32 and the recording or reproducing of data is being performed with the head 31, the control unit 37 performs a reverse rotation of the cam rotating motor 41 as a result of the detection of the tape winding diameter D by the tape winding diameter detecting unit 85. When the tape winding diameter D is detected to be smaller than a reference diameter based upon the signal from the sensor 102, the control unit 37 outputs a control signal to the motor 41 so that the cam 40 is rotated by the motor 41 slightly in the reverse direction back so as to decrease the pressing force of the brake part 53 on the supply reel shaft 33.

Figure 7:
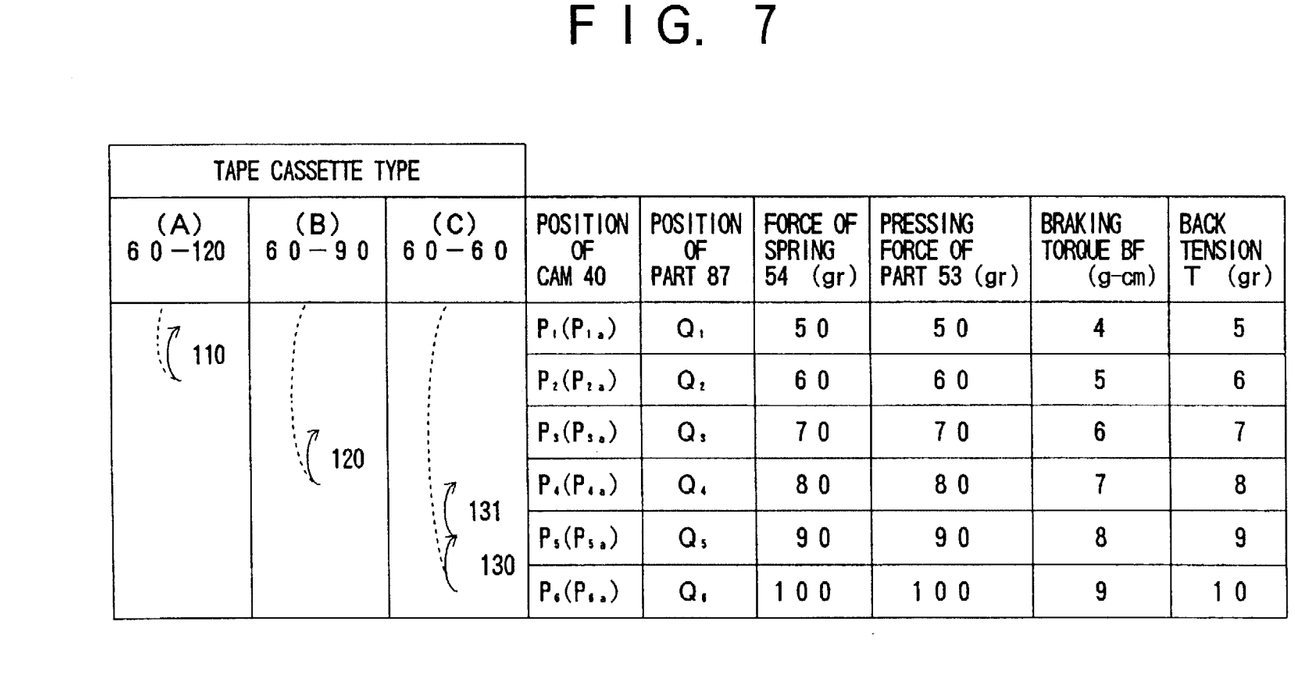
FIG. 7 is a diagram for explaining operations of respective related parts of the magnetic tape apparatus 30 in FIG. 3.

FIG. 7 shows operations of respective related parts of the magnetic tape apparatus 30 in FIG. 3. In FIG. 7, the rotational position of the cam 40, the position of the spring fixing part 87, the rotating force of the helical tension spring 54, the pressing force of the brake part 53, the braking torque BF on the supply reel shaft 33, and the back tension T of the magnetic tape, which are varied for each of the cassette types 60-120, 60-90 and 60-60, are shown.

Next, a description will be given of the operation of the pressing force varying mechanism 80 for each of the tape cassette types 60-120, 60-90 and 60-60, with reference to FIGS. 7 and 8.

(A) The case of the 120-m tape cassette (60-120) being inserted for the use:

In the case of the 120-m tape cassette 60-120, the magnetic tape 62-120 is 7 μm (microns) thick, and the optimal value of the back tension T for this tape cassette is set at 6 gr (grams).

When the tape cassette of this type is inserted into the magnetic tape apparatus 30, the cassette type detecting unit 86 detects that the inserted cassette is the 120-m tape cassette 60-120. The cam 40 is rotated by the motor 41 in the forward direction to the position P2 (P2a), and the forward rotation of the cam 40 is stopped. After this, the recording or reproducing of data with the magnetic tape is performed by the magnetic tape apparatus 30 in this condition.

In the pressing force varying mechanism 80, the spring fixing part 87 is moved to the position Q2. In the back tension applying mechanism 36, the rotating force of the helical tension spring 54 is set at 60 gr, the pressing force F of the brake part 53 is set at 60 gr, and the braking torque BF on the supply reel shaft 33 is set at 5 gr-cm (gram-centimeter). Accordingly, the back tension T applied to the magnetic tape is initially set at 6 gr which is the optimal level for this tape cassette.

The magnetic tape 62, pulled out from the supply reel 64 of this tape cassette, is wound on the rotary drum 32, and the recording or reproducing of data is performed by the head 31 while the back tension T applied to the magnetic tape 62 is maintained at the optimal level. Therefore, it is possible for the magnetic tape apparatus 30 of the present embodiment to provide a stable, good recording and reproducing performance for the magnetic tape of this tape cassette.

Figure 8:
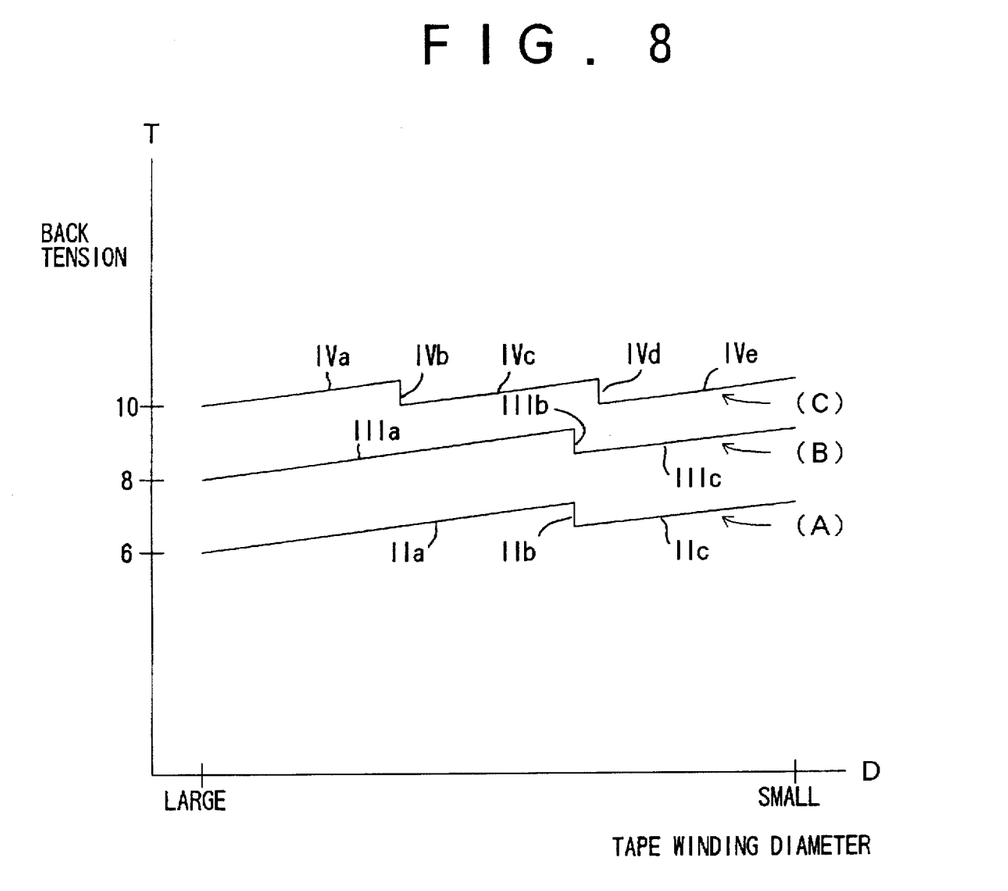
FIG. 8 is a diagram for explaining a relationship between a tape winding diameter and a back tension in the magnetic tape apparatus in FIG. 3.

FIG. 8 shows a relationship between the tape winding diameter D and the back tension T in the magnetic tape apparatus 30 in FIG. 3 for each of the tape cassette types 60-120, 60-90 and 60-60.

In FIG. 8, the relationship for the tape cassette type 60-120 (Case (A)) is indicated by lines "IIa", "IIb" and "IIc", the relationship for the tape cassette type 60-90 (Case (B)) is indicated by lines "IIIa", "IIIb" and "IIIc", and the relationship for the tape cassette type 60-60 (Case (C)) is indicated by lines "IVa", "IVb", "IVc", "IVd" and "IVe".

As the magnetic tape 62 is running on the rotary drum 32 in the forward direction, the tape winding diameter D gradually decreases. As indicated by the line IIa in FIG. 8, when the tape winding diameter D decreases, the back tension T applied to the magnetic tape 62 is gradually increased.

The tape winding diameter D, as the magnetic tape 62 is running, is smaller than a reference diameter (for example, half the maximum diameter of the tape winding on the supply reel 64), and this is detected by the tape winding diameter detecting unit 85. A reverse rotation of the motor 41 is performed by the control signal output from the control unit 37. The cam 40 is rotated in the reverse direction by the motor 41, as indicated by the arrow "110" in FIG. 7.

The cam 40 is rotated in the reverse direction to the position P1 (P1a), and this is detected by the cam position detecting unit 42. The rotation of the motor 41 is stopped by the control unit 37, and the cam 40 stays at the position P1 (P1a).

As the cam 40 is rotated in the reverse direction indicated by the arrow 110, the sliding lever 82 is moved in the direction "X" due to the rotating force of the helical torsion spring 92, and the sliding lever 84 is moved in the direction "Y1" via the connecting lever 83. The spring fixing part 87 on the sliding lever 84 is moved in the direction "Y1" from the position "Q2" to the position "Q1". Thus, the rotating force of the spring 54 on the brake arm 52 is reduced to 50 gr, the pressing force F of the brake part 53 is reduced to 50 gr, and the braking torque BF on the supply reel shaft 33 is reduced to 4 gr-cm.

Accordingly, as indicated by the line IIb in FIG. 8, the back tension T, which has been increased to about 7 gr, is decreased by the difference in the braking torque BF (between 5 gr and 4 gr) to about 6 gr, which is approximately the optimal level for the magnetic tape of this tape cassette.

When the tape winding diameter D further decreases from the above reference diameter, the back tension T applied to the magnetic tape 62 is again gradually increased as indicated by the line IIc in FIG. 8.

Accordingly, it is possible for the magnetic tape apparatus 30 of the present embodiment to provide a stable, good recording and reproducing performance for the whole length of the magnetic tape 62 at any time when the magnetic tape 62 is running on the rotary drum 32. It is possible for the magnetic tape apparatus 30 to maintain the back tension T applied to the magnetic tape 62 approximately at the optimal level for any portion of the magnetic tape 62 and at any time when it is running on the rotary drum 32.

(B) The case of the 90-m tape cassette (60-90) being inserted for the use:

In the case of the 90-m tape cassette 60-90, the magnetic tape 62-90 is 9 μm thick, and the optimal value of the back tension T for this tape cassette is set at 8 gr.

When the tape cassette of this type is inserted into the magnetic tape apparatus 30, the cassette type detecting unit 86 detects that the inserted cassette is the 90-m tape cassette 60-90. The cam 40 is rotated by the motor 41 in the forward direction to the position P4 (P4a), and the forward rotation of the cam 40 is stopped. After this, the recording or reproducing of data with the magnetic tape is performed by the magnetic tape apparatus 30 in this condition.

In the pressing force varying mechanism 80, the spring fixing part 87 is moved to the position Q4. In the back tension applying mechanism 36, the rotating force of the helical tension spring 54 is set at 80 gr, the pressing force F of the brake part 53 is set at 80 gr, and the braking torque BF on the supply reel shaft 33 is set at 7 gr-cm. Accordingly, the back tension T applied to the magnetic tape is initially set at 8 gr which is the optimal level for this tape cassette.

The magnetic tape 62, pulled out from the supply reel 63 of this tape cassette, is wound on the rotary drum 32, and the recording or reproducing of data is performed by the head 31 while the back tension T applied to the magnetic tape 62 is maintained at the optimal level. Therefore, it is possible for the magnetic tape apparatus 30 of the present embodiment to provide a stable, good recording and reproducing performance for the magnetic tape of this tape cassette.

As the magnetic tape 62 is running on the rotary drum 32 in the forward direction, the tape winding diameter D gradually decreases. As indicated by the line IIIa in FIG. 8, when the tape winding diameter D decreases, the back tension T applied to the magnetic tape 62 is gradually increased.

The tape winding diameter D, as the magnetic tape 62 is running, is smaller than the above-mentioned reference diameter, and this is detected by the tape winding diameter detecting unit 85. A reverse rotation of the motor 41 is performed by the control signal output from the control unit 37. The cam 40 at this time is rotated in the reverse direction by the motor 41, as indicated by the arrow "120" in FIG. 7.

The cam 40 is rotated in the reverse direction to the position P3 (P3a), and this is detected by the cam position detecting unit 42. The rotation of the motor 41 is stopped by the control unit 37, and the cam 40 stays at the position P3 (P3a).

As the cam 40 is rotated in the reverse direction indicated by the arrow 120, the sliding lever 82 is moved in the direction "X2" due to the rotating force of the helical torsion spring 92, and the sliding lever 84 is moved in the direction "Y1" via the connecting lever 83. The spring fixing part 87 on the sliding lever 84 is moved in the direction "Y1" from the position "Q4" to the position "Q3". Thus, the rotating force of the spring 54 on the brake arm 52 is reduced to 70 gr, the pressing force F of the brake part 53 is reduced to 70 gr, and the braking torque BF on the supply reel shaft 33 is reduced to 6 gr-cm.

Accordingly, as indicated by the line IIIb in FIG. 8, the back tension T, which has been increased to about 9 gr, is decreased by the difference in the braking torque BF (between 7 gr and 6 gr) to about 8 gr, which is approximately the optimal level for the magnetic tape of this tape cassette.

When the tape winding diameter D further decreases from the above reference diameter, the back tension T applied to the magnetic tape 62 is again gradually increased as indicated by the line IIIc in FIG. 8.

Accordingly, it is possible for the magnetic tape apparatus 30 of the present embodiment to provide a stable, good recording and reproducing performance for the whole length of the magnetic tape 62 at any time when the magnetic tape 62 is running on the rotary drum 32. It is possible for the magnetic tape apparatus 30 to maintain the back tension T applied to the magnetic tape 62 approximately at the optimal level for any portion of the magnetic tape 62 and at any time when it is running on the rotary drum 32.

(C) The case of the 60-m tape cassette (60-60) being inserted for the use:

In the case of the 60-m tape cassette 60-60, the magnetic tape 62-60 is 13 μm thick, and the optimal value of the back tension T for this tape cassette is set at 13 gr.

When the tape cassette of this type is inserted into the magnetic tape apparatus 30, the cassette type detecting unit 86 detects that the inserted cassette is the 60-m tape cassette 60-60. The cam 40 is rotated by the motor 41 in the forward direction to the position P6 (P6a), and the forward rotation of the cam 40 is stopped. After this, the recording or reproducing of data with the magnetic tape is performed by the magnetic tape apparatus 30 in this condition.

In the pressing force varying mechanism 80, the spring fixing part 87 is moved to the position Q6. In the back tension applying mechanism 36, the rotating force of the helical tension spring 54 is set at 100 gr, the pressing force F of the brake part 53 is set at 100 gr, and the braking torque BF on the supply reel shaft 33 is set at 9 gr-cm. Accordingly, the back tension T applied to the magnetic tape is initially set at 10 gr which is the optimal level for this tape cassette.

The magnetic tape 62, pulled out from the supply reel 64 of this tape cassette, is wound on the rotary drum 32, and the recording or reproducing of data is performed by the head 31 while the back tension T applied to the magnetic tape 62 is maintained at the optimal level. Therefore, it is possible for the magnetic tape apparatus 30 of the present embodiment to provide a stable, good recording and reproducing performance for the magnetic tape of this tape cassette.

As the magnetic tape 62 is running on the rotary drum 32 in the forward direction, the tape winding diameter D gradually decreases. As indicated by the line IVa in FIG. 8, when the tape winding diameter D decreases, the back tension T is gradually increased.

The tape winding diameter D, as the magnetic tape 62 is running, is smaller than a first reference diameter (for example, about two-thirds of the maximum diameter of the tape winding on the supply reel 64), and this is detected by the tape winding diameter detecting unit 85. A reverse rotation of the motor 41 is performed by the control signal output from the control unit 37. The cam 40 is rotated in the reverse direction by the motor 41, as indicated by the arrow "130" in FIG. 7.

The cam 40 is rotated in the reverse direction to the position P5 (P5a), and this is detected by the cam position detecting unit 42. The rotation of the motor 41 is stopped by the control unit 37, and the cam 40 stays at the position P5 (P5a).

As the cam 40 is rotated in the reverse direction indicated by the arrow 130, the sliding lever 82 is moved in the direction "X2", and the sliding lever 84 is moved in the direction "Y1" via the connecting lever 83. The spring fixing part 87 is moved in the direction "Y1" from the position "Q6" to the position "Q5". Thus, the rotating force of the spring 54 on the brake arm 52 is reduced to 90 gr, the pressing force F of the brake part 53 is reduced to 90 gr, and the braking torque BF on the supply reel shaft 33 is reduced to 8 gr-cm.

As indicated by the line IVb in FIG. 8, the back tension T, which has been increased to about 11 gr, is decreased by the difference in the braking torque BF (between 9 gr and 8 gr) to about 10 gr, which is approximately the optimal level for the magnetic tape of this tape cassette.

After this, as indicated by the line IVc in FIG. 8, the tape winding diameter D further decreases from the first reference diameter, and the back tension T is again gradually increased.

The tape winding diameter D, as the magnetic tape 62 is running, is smaller than a second reference diameter (for example, about one-third of the maximum diameter of the tape winding on the supply reel 64), and this is detected by the tape winding diameter detecting unit 85. A reverse rotation of the motor 41 is performed by the control signal output from the control unit 37. The cam 40 is rotated in the reverse direction by the motor 41, as indicated by the arrow "131" in FIG. 7.

The cam 40 is rotated in the reverse direction to the position P4 (P4a), and this is detected by the cam position detecting unit 42. The rotation of the motor 41 is stopped by the control unit 37, and the cam 40 stays at the position P4 (P4a).

As the cam 40 is rotated in the reverse direction indicated by the arrow 131, the sliding lever 82 is moved in the direction "X2", and the sliding lever 84 is moved in the direction "Y1" via the connecting lever 83. The spring fixing part 87 is moved in the direction "Y1" from the position "Q5" to the position "Q4". Thus, the rotating force of the spring 54 on the brake arm 52 is reduced to 80 gr, the pressing force F of the brake part 53 is reduced to 80 gr, and the braking torque BF on the supply reel shaft 33 is reduced to 7 gr-cm.

As indicated by the line IVd in FIG. 8, the back tension T is decreased from about 11 gr by the difference in the braking torque BF to about 10 gr. which is approximately the optimal level for the magnetic tape of this tape cassette.

After this, as indicated by the line IVe in FIG. 8, the tape winding diameter D further decreases from the second reference diameter, and the back tension T is again gradually increased.

Accordingly, it is possible for the magnetic tape apparatus 30 of the present embodiment to provide a stable, good recording and reproducing performance for the whole length of the magnetic tape 62 at any time when the magnetic tape 62 is running on the rotary drum 32. It is possible for the magnetic tape apparatus 30 to maintain the back tension T applied to the magnetic tape 62 approximately at the optimal level for any portion of the magnetic tape 62 and at any time when it is running on the rotary drum 32.

Even when the magnetic tapes of these cassettes have different thicknesses and one of those cassettes is inserted, the magnetic tape apparatus 30 can maintain the back tension applied to the magnetic tape at the optimal value for the cassette type at any time, in order to always make the contact between the head and the magnetic tape suitable.

In the above-described embodiment, the detection of the tape winding diameter D by the tape winding diameter detecting unit 85 in order to reversely rotate the cam 40 is performed once for the 120-m tape cassette and the 90-m tape cassette and twice for the 60-m tape cassette. However, the magnetic tape apparatus of the present invention is not limited to this embodiment, and variations and modifications may be made. For example, it is conceivable that if the number of the above detections is further increased the magnetic tape apparatus can provide a more stable, better recording and reproducing performance for the whole length of the magnetic tape at any time when the magnetic tape is running on the rotary drum.

In the above-described embodiment, the magnetic tape apparatus in FIG. 3 is applied to the DAT system. However, the magnetic tape apparatus of the present invention can be applied to a video tape recorder (VTR) system or another magnetic tape system. Further, the present invention is not limited to the above-described embodiment, and variations and modifications may be made without departing from the present invention.

What is claimed is:

1. A magnetic tape apparatus comprising:

a cassette inserted in the magnetic tape apparatus, the cassette having a magnetic tape, a supply reel and a take-up reel, the tape being wound on the supply reel and the take-up reel in the cassette;

a head for reproducing data from or recording data onto the tape when the apparatus is running;

a supply reel shaft for rotating the supply reel to supply the tape from the cassette to said head;

a take-up reel shaft for rotating the take-up reel to wind the tape from said head around the take-up reel;

back tension applying means having a rotatable brake arm, a brake part fixed to the brake arm, and a spring connected to the brake arm, said brake part pressing the supply reel shaft to produce a braking force on the supply reel shaft, said spring exerting a rotating force to rotate the break arm such that a back tension is applied to the tape by said brake part when the braking force is produced; and pressing force varying means for controlling a pressing force of said brake part on the supply reel shaft such that the pressing force is adjusted to a selected level, said pressing force varying means comprising a movable lever having a spring fixing part connected to the spring of the back tension applying means, said movable lever being moved in response to a type of cassette and displacing a position of the spring fixing part relative to the brake arm, thereby adjusting the pressing force of the brake part on the supply reel shaft to the selected level.

2. The apparatus according to claim 1, wherein said pressing force varying means decreases said pressing force when a tape winding diameter of the supply reel decreases to a reference diameter.

3. The apparatus according to claim 1, wherein the cassette has a type according to an overall length of the tape, and said pressing force varying means comprises:

means for setting said pressing force at one of a plurality of different values according to the type of the cassette, said different values being predetermined to be appropriate for a plurality of cassette types, respectively.

4. The apparatus according to claim 3, wherein said pressing force varying means comprises:

means for detecting the type of the inserted cassette based upon a signal from a switch, said signal indicating a cassette type identification part of the inserted cassette which is one of a plurality of cassette types.

5. The apparatus according to claim 1, wherein said pressing force varying means comprises:

means for detecting whether the tape winding diameter is smaller than the reference diameter, based upon a signal from a rotating speed sensor, said signal indicating a rotating speed of the supply reel shaft.

6. The apparatus according to claim 1, wherein said pressing force varying means further comprises:

means for rotating a cam to a rotational position according to said selected level, said cam being connected to said movable lever such that said pressing force varying means moves the movable lever by the rotation of the cam.

7. The apparatus according to claim 1, wherein said pressing force applying means further comprises means for reversely rotating a cam when the tape winding diameter is smaller than a reference diameter, so as to decrease the pressing force of the brake part on the supply reel shaft, said cam being connected to said movable lever such that said pressing force varying means moves the movable lever in a reverse direction by the reverse rotation of the cam.

8. The apparatus according to claim 1, further comprising movable pole means for taking out the tape from the cassette.

* * * * *